United States Patent
Godbersen

[11] Patent Number: 5,133,570
[45] Date of Patent: Jul. 28, 1992

[54] PIVOTAL BUNK UNIT FOR BOAT TRAILER

[76] Inventor: Byron L. Godbersen, Lake June Estates, Ida Grove, Iowa 51445

[21] Appl. No.: 650,046

[22] Filed: Feb. 4, 1991

Related U.S. Application Data

[63] Continuation of Ser. No. 408,679, Sep. 18, 1989, abandoned.

[51] Int. Cl.5 .............................................. B60P 3/10
[52] U.S. Cl. ................................ 280/414.1; 248/185; 248/291; 414/532
[58] Field of Search .............. 280/414.1, 414.2, 414.3, 280/482, 437, 441; 114/344; 414/531, 532, 536, 537; 403/362, 61, 115, 111, 116, 117, 121, 104; 248/297, 288.3, 181, 185; 108/6

[56] References Cited

U.S. PATENT DOCUMENTS

| 1,139,823 | 5/1915 | Thomas et al. | 248/185 |
| 1,182,569 | 5/1916 | Kelley | 280/433 |
| 3,131,902 | 5/1964 | Zak | 280/414.1 |
| 3,337,171 | 8/1967 | Canning | 280/414.1 |
| 3,572,743 | 3/1971 | Parr | 280/414.1 |
| 3,993,324 | 11/1976 | Carrick | 280/414.1 |
| 4,529,217 | 7/1985 | Wood | 280/414.1 |
| 4,575,033 | 3/1986 | Henneberg et al. | 248/185 |

Primary Examiner—Charles A. Marmor
Assistant Examiner—Anne Boehler
Attorney, Agent, or Firm—Henderson & Sturm

[57] ABSTRACT

A boat trailer having elongated bunk units for engagement with a portion of the hull of a boat, the bunk members rockable about a normally horizontal axis longitudinally of the boat for automatic nesting engagement with the boat hull, accommodating the improved hull engaging bunk units for a variety of various designed craft hulls.

2 Claims, 1 Drawing Sheet

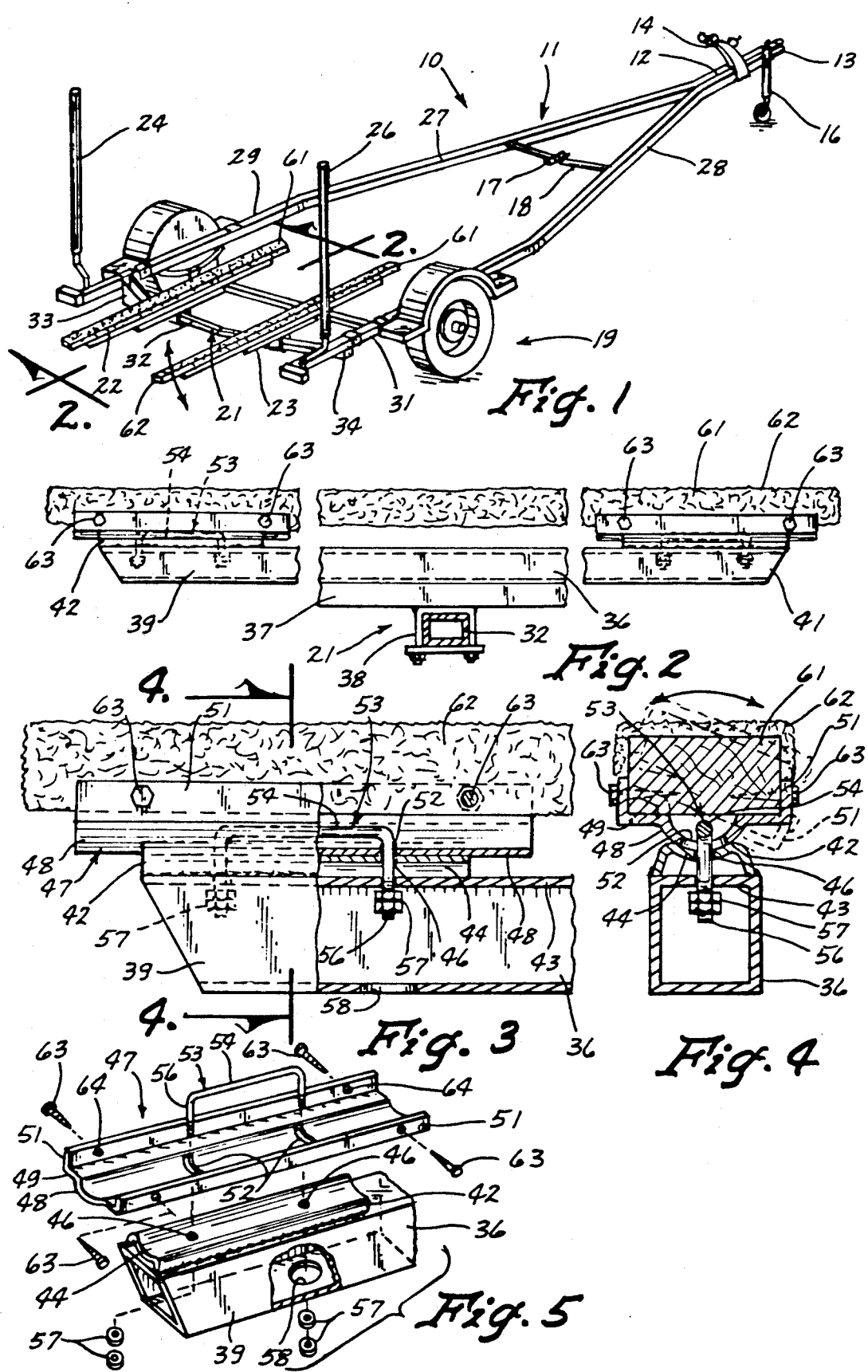

PIVOTAL BUNK UNIT FOR BOAT TRAILER

This is a continuation of copending application Ser. No. 07/408,679 filed on Sep. 18, 1989 now abandoned.

TECHNICAL FIELD

The present invention relates to boat trailers in general, and in particular to bunk-type boat trailers for transporting a variety of boats of the pleasure boat type.

BACKGROUND ART

With an ever increasing number of different sized and shaped boats due to the increasing popularity of this industry, it is recognized that the trailer must securely support the boat carried thereby, and that the boat hull supporting elements quickly conform to the contour of the hull for proper distribution of the weight of the boat and to avoid localized stresses.

Whereas a great number and variety of roller-type hull engaging elements have been devised and designed to accomplish this purpose, such as U.S. Pat. No. 4,329,108 to Godbersen, improvements in the use of the elongated bunks for supporting boat hulls have not kept pace with the need for adaptability for various degrees and styles of hull contours.

DISCLOSURE OF THE INVENTION

It is therefore an object of this invention to provide an improved boat trailer.

It an another object of this invention to mount bunk-type hull supporting elements for pivotal and rockable movement about an axis parallel to the longitudinal axis of the boat trailer.

It is yet another object of this invention to provide a nested mounted structure for bunk-type hull supporting elements whereby each bunk can quickly adjust about a normally horizontal axis extended parallel the longitudinal axis of the trailer for securely engaging the hull of the boat supported thereon.

These and other objects are attained in accord with the present invention wherein there is provided a pivotally mounted hull-engaging bunk assembly for facilitating handling a boat and assuring efficient and effective support of the boat. The pivotal mounting structure provides for the bunks to tilt inwardly, for example, to accommodate the contour of a boat hull, while maintaining a full line seating arrangement with a supporting member for structural stability. A first element is secured to the base of a bunk and has a convex-shaped base which nests within the concave-shaped portion of a second element, the second element mounted on a pivotal cross member of the trailer, and with the first and second elements joined for pivotal movement of the first, upper element relevant to the lower, second element. The improved bunk-type mounting assembly accommodates a variety of boat hull contours.

BRIEF DESCRIPTION OF THE DRAWINGS

These and other attributes of the invention will become more clear upon a thorough study of the following description of a preferred embodiment of the invention, particularly when reviewed in conjunction with the accompanying drawings, wherein:

FIG. 1 is a perspective view of a boat trailer of the present invention;

FIG. 2 is an enlarged, fragmentary side elevational view as taken along the line 2—2 in FIG. 1;

FIG. 3 is a further enlarged view of one end of the structure of FIG. 2, partly broken away for clarity of the invention;

FIG. 4 is a vertical sectional view taken along the line 4—4 in FIG. 3; and

FIG. 5 is a fragmentary, partially exploded perspective view of the elements of FIG. 3.

BEST MODES FOR CARRYING OUT THE INVENTION

Although not intended to be so limited, for convenience of illustration the improved boat trailer bunk mounting system of this invention is shown in connection with a trailer for loading and supporting a low or shallow draft-type boat. The illustrated trailer construction enables the boat to be loaded directly from the water by backing the trailer down a ramp or incline and bringing the rearmost hull engaging bunk assemblies of the trailer into position close to the floating boat. The boat is then advanced into contact with the bunk assemblies and drawn forward into supporting engagement therewith and with the forward keel supporting structure for full engagement and support of the boat for purposes of transportation.

Referring now to the drawings, particularly FIG. 1, the boat trailer of this invention is illustrated generally at (10) and comprises a frame assembly (11) including a tongue (12) and hitch (13) for conventional attachment to a prime mover (not shown); a winch assembly (14) for detachable connection to a boat (not shown) to be transported thereby; a stand assembly (16) for supporting the frame assembly (11) in a horizontal condition; an front keel supporting assembly (17) pivotally mounted on a front cross bar (18); a wheel and axle (19) for supporting the frame assembly (11) adjacent the rear end thereof; a rear cross bar assembly (21) pivotally connected to the frame assembly (11); a pair of bunk units (22) and (23) each secured in transversely spaced relation to the rear cross bar assembly (21); and a pair of guide members (24), (26) for guiding the boat to be transported by the trailer (10) onto and off of the trailer (10).

Let it be noted that the frame assembly (11) has an A-shape with converged portions of the frame assembly (11) forming the tongue (12), and with outwardly diverging frame members (27) and (28) including the fore part of the frame assembly (11), with parallel and rearwardly extending frame members (29) and (31), completing the frame assembly (11), the rear frame members (29) and (31) extended parallel each other and to the longitudinal axis of the frame assembly (11). The rear cross bar assembly (21) comprises a slightly V-shaped cross member (32) which has a pair of brackets (33), (34) connected at each outer end thereof for pivotal mounting to the respective rear frame members (29), (31). By this arrangement, the rear cross bar assembly (21) and the bunk units (22), (23) carried thereby is pivotally swingable about a normally horizontal axis transverse the rear of the frame assembly (11) for accommodating movement of a boat hull onto or off of the trailer (10).

As each of the bunk units (22), (23) is identical, only one will be described, the bunk unit (23), for example, being best illustrated in FIGS. 2 through 5 inclusive. The bunk unit (22) comprises an elongated, tubular member (36) to the square shaped in cross section, connected to an integral width a shorter, under portion (37) which is secured to the cross member (32) by a plurality of inverted U-clamp units as best seen in FIG. 2.

At each fore and aft end (39), (41) of the member (36), a seat element (42) is secured as by welding to the top (43) of the member (36), each seat element having a rounded M-shape in cross section as best shown in FIG. 4 with a central concave portion (44) formed therein. A pair of spaced openings (46) (FIG. 5) are formed in longitudinally spaced relation of the seat element (42) for a purpose described hereinafter.

Adapted to be mounted above the seat element (42) for a nested, rockable or pivotal engagement therewith is an elongated bunk supporting element (47) (FIG. 5) having a central convex portion (48) adapted to nest with the concave (44) of the seat element (42), including further outwardly extended floor portions (49) with upright side portions (51). As best shown in FIG. 5, a pair of longitudinally spaced, transversely extended slots (52) are formed in the concave portion (48) for vertical alignment with the openings (46) in the seat element (42).

The seated elements (42) and (47) are loosely connected whereby the upper bunk supporting element (47) is rockable or pivotal relative to the fixed lower seat element (42), by an elongated U-bolt (53), the upper leg (54) of which rests longitudinally along the upper surface of the convex portion (48), with the downwardly extended legs (54) extended through the aligned sets of slots (52) and openings (46), and with fastening devices (57) securing the threaded lower ends of the legs (56). It will be noted in FIG. 5 particularly that a opening (58) is formed in the floor (59) of the member (36) to provide for the fastening devices (57) for that particular leg (56) of the bolt (53). By this arrangement, and referring to FIG. 4, it is clearly seen that the upper bunk supporting element (47) is movable about a normally horizontal, transverse axis in an arcuate manner so as to tilt either inwardly relative to the longitudinal axis of the trailer (11), or outwardly as the case may be.

Securely mounted in a nested condition within the bunk supporting element (47) is an elongated bunk (61) normally of wood composition of the like, covered by a material (62) for providing a cushioned support of the boat hull (not shown) engageable and supportable thereby. The bunk (61) is secured within the element (47) by fasteners (63) inserted through transversely opposed openings (64) formed in longitudinally spaced relation in the side portions (51) of the element (47). By this arrangement, the bunk (61) is pivotally mounted at each end to the tubular member (36) which is secured to the cross member (32), and upon engagement by the hull of a boat being moved onto the frame assembly (11), the bunks (61) pivotally accommodate the particular shape of that particular being engaged thereby, and with the bunk (61) and its end supporting elements (47) remaining in a nested, seated engagement with the member (36) and seat element (42) for structural soundness and stability of the hull support provided by this improved bunk arrangement.

Accordingly, it can be seen that the illustrated embodiment of the present invention accomplishes all of the objectives referred to hereinbefore. Obviously, many modifications and variations of the present invention are possible in light of the above teachings. It is therefore to be understood that, within the scope of the appended claims, the invention may be practiced otherwise than as specifically described.

I claim:

1. A bunk assembly for supporting a boat having a hull on a trailer having a longitudinal axis wherein the trailer includes a frame including at least one cross bar integral therewith and extended transversely to the longitudinal axis of the trailer and supported between spaced side frame members, the improvement comprising:
   at least a pair of elongated bunk units extended parallel each other and to the trailers longitudinal axis;
   means mounting said bunk units on the cross bar for tilting movement about an axis parallel the trailer longitudinal axis whereby said bunk units are automatically positioned upon engagement with the hull of a boat being moved into engagement with the trailer to provide a cradle for the boat hull;
   wherein each said bunk unit comprises an elongated rectangular bunk member having a cushioning element secured at least to the upper surface thereof for engagement with the boat hull;
   wherein each said bunk unit mounting means includes an elongated base member, a first seat element mounted on said base member and having a longitudinally extended concave portion, and a second seat element also having a longitudinally extended convex portion and being tiltably mounted on said first seat element and secured to said bunk member, the convex portion of said second seat element nested into the concave portion of said first seat element and wherein the second seat element is movable rockably and pivotally relative to said first seat element, said seat elements moving about one axis relative to each other; and
   wherein each said bunk unit mounting means includes further first openings formed in longitudinally spaced relation in said first seat element, second slots formed transversely in longitudinally spaced relation in said second seat element and alignable with said first openings, and fastening means insertable through said aligned first openings and said second slots, whereby said second seat element is movable arcuately within said second slots and about an axis longitudinal of said seat elements while remaining mounted on said first seat element.

2. A bunk assembly as in claim 1, wherein said first and second seat elements are nested with each other regardless of the tilted relationship of said second seat element to said first seat element, for providing a cradled support of the boat hull.

* * * * *